Aug. 2, 1955

W. VUTZ 2,714,454

MAGNETIC SWEEPER

Filed April 5, 1954

INVENTOR
William Vutz
BY Leo C. Krazynski
ATTORNEY

Aug. 2, 1955

W. VUTZ 2,714,454

MAGNETIC SWEEPER

Filed April 5, 1954

INVENTOR
*William Vutz*

BY *Leo C. Krazynski*

ATTORNEY

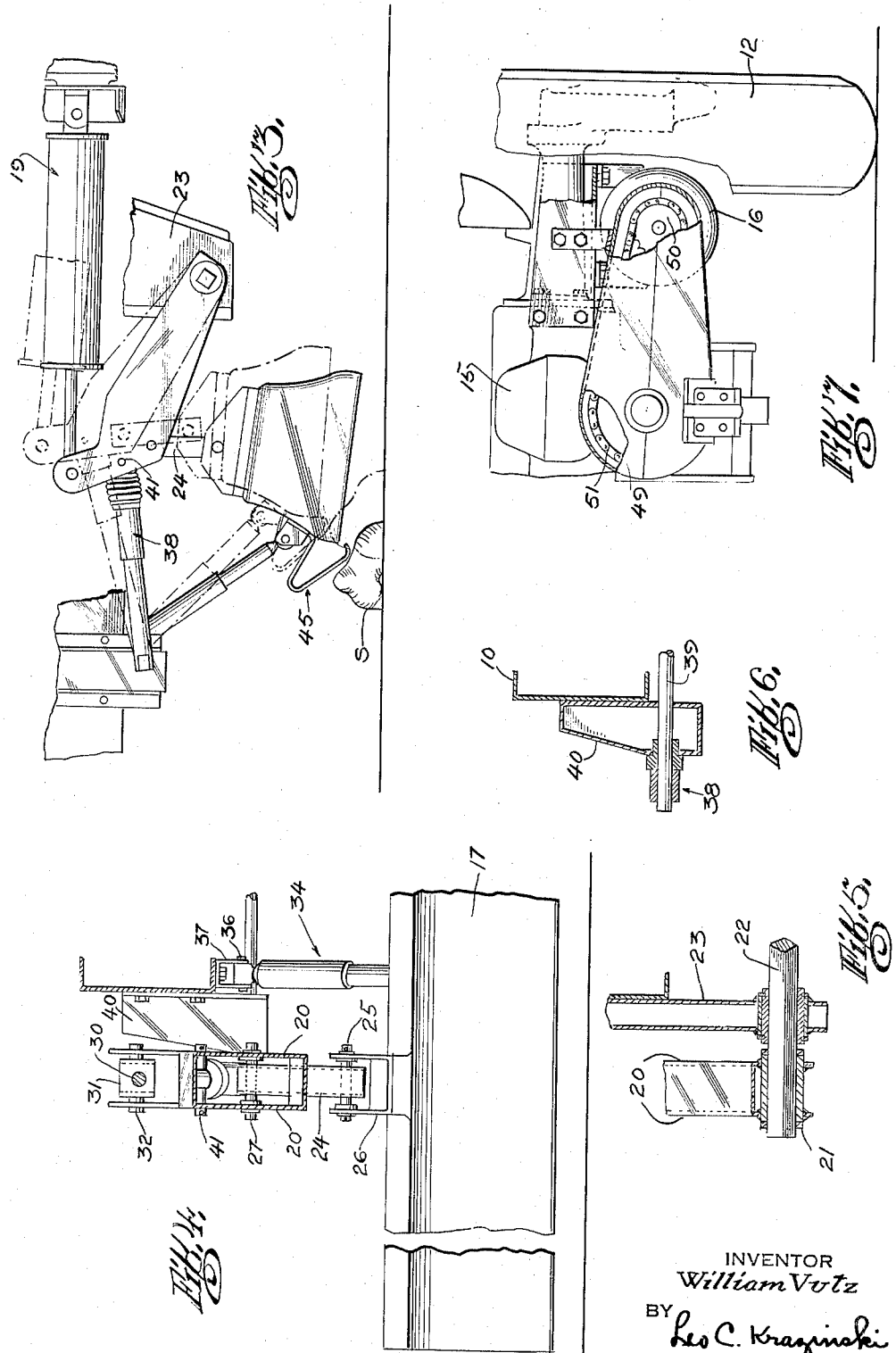

United States Patent Office 2,714,454
Patented Aug. 2, 1955

2,714,454

MAGNETIC SWEEPER

William Vutz, Lititz, Pa., assignor to Consolidated Diesel Electric Corporation, Stamford, Conn., a corporation of New York Application April 5, 1954, Serial No. 421,124

14 Claims. (Cl. 209—215)

The present invention relates to electro-magnets for picking up objects of magnetic metal from the ground, including highways, air fields, and the like, and more particularly, to an improved electro-magnetic carried by a land vehicle.

Heretofore, land vehicles have been provided with electro-magnets for clearing working areas and highways of magnetic material to prevent injury to persons, to prevent damage to pneumatic rubber tires and to salvage the material. Such apparatus in the past was equipped with a separate power plant for energizing the electro-magnet. This required either mounting the magnet on a tractor drawn by another vehicle or mounting the magnet on a truck which carried the power plant. In the first instance an additional piece of equipment was required and, in the second instance, the otherwise useful space of the truck was not available.

Also, in the past the magnet was mounted in a manner whereby it would be damaged upon striking rather large stones or while working on rough terrain. Such conditions are encountered on air fields, where it is desirable to clear the field of metallic objects which might otherwise be sucked up by jet engines and cause internal damage thereto.

Accordingly, an object of the present invention is to provide a magnetic sweeper which is not subject to the foregoing disadvantages.

Another object is to provide a magnetic sweeper as a part of a land vehicle wherein no additional power plant is required to energize the magnet.

Another object is to provide a magnetic sweeper wherein the magnet is suspended from the land vehicle in an improved manner.

Another object is to provide a magnetic sweeper wherein the magnet is protected against damage by small obstructions and is movable at will to clear large obstructions.

A further object is to provide such a magnetic sweeper which is compact and economical in construction and practical and mobile in operation.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Fig. 3 is a fragmentary side elevational view, illustrating the movement of the electro-magnet.

Fig. 4 is a sectional view taken along the line 4—4 on Fig. 1.

Fig. 5 is a sectional view taken along the line 5—5 on Fig. 1.

Fig. 6 is a sectional view taken along the line 6—6 on Fig. 1.

Fig. 7 is a partial, rear elevational view, illustrating the drive for the electrical generator, portions being broken away for clearness.

Figure 1:
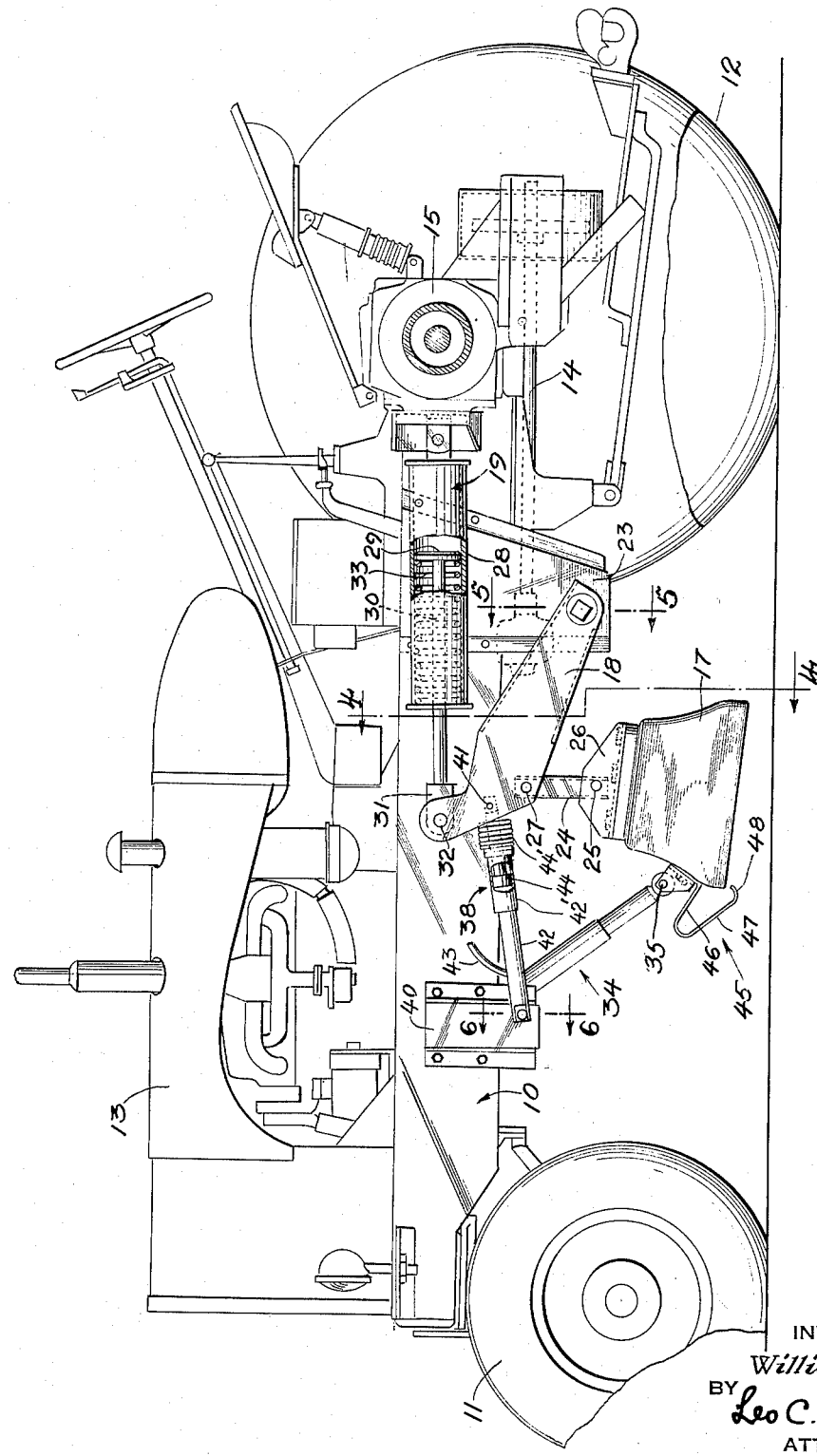
Fig. 1 is a side elevational view of a magnetic sweeper in accordance with the present invention, portions thereof being broken away for clarity.
Figure 2:
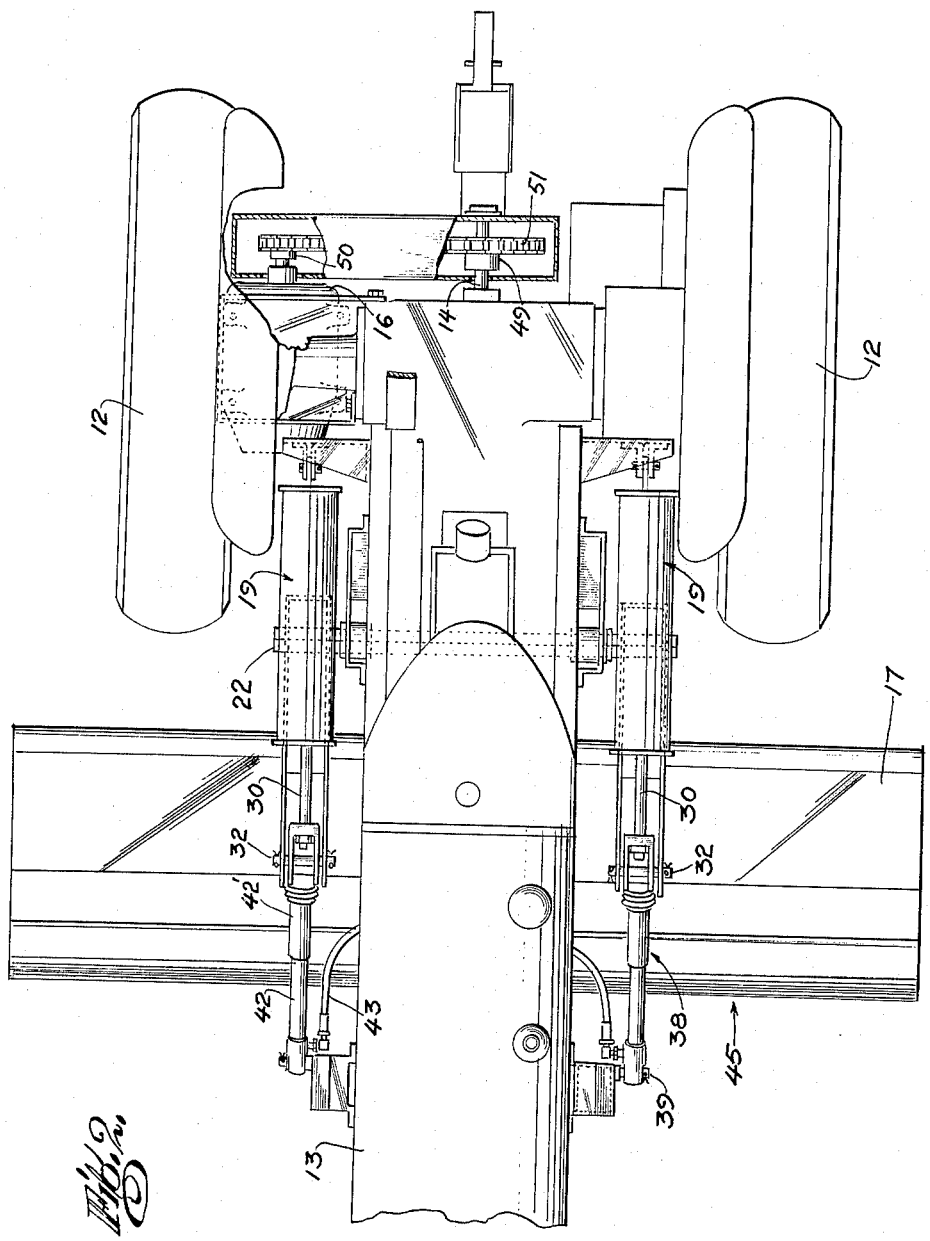
Fig. 2 is a plan view of the magnetic sweeper shown in Fig. 1, but illustrating only the middle and rear sections thereof.

Referring to the drawings, particularly to Figs. 1 and 2 thereof, there is shown a magnetic sweeper generally comprising a tractor including a chassis 10, front wheels 11, rear wheels 12, an internal combustion engine 13, transmission means (not shown) including a power take-off drive shaft 14, and differential gear means 15 for driving the rear wheels 12, an electrical generator 16 mounted adjacent the rear end of the chassis near one of the rear wheels and driven by the engine 13 through the power take-off drive shaft 14, and an electro-magnet 17, energized by the generator and carried by the chassis in a manner described hereinafter.

The magnet 17 extends crosswise beneath the chassis and is supported adjacent each end between the front and rear wheels for swinging movement by an arrangement which comprises bellcrank means 18 at each side of the chassis and a mechanism 19 for partially counter-balancing the weight of the magnet.

As shown in Figs. 1 to 5, each of the bellcrank means 18 includes a pair of spaced apart bellcrank members 20 pivotally mounted at one end thereof on a bearing 21 arbored on a shaft 22 which extends between the bellcrank means and outwardly from the respective sides of brackets 23 depending from the chassis, the shaft being arbored in the brackets. The bellcrank members 20 are connected together adjacent the bearing 21 (Figs. 1 and 5) to strengthen the same. The shaft 22 is non-circular in section, preferably square, as shown, in order to produce synchronous movement of the spaced bellcrank means 18.

The magnet 17 is pivotally suspended from the bellcrank means by a link 24 connected at one end by a pin 25 extending through lugs 26 on the magnet and connected at the other end by a pin 27 extending through the members 20 (Fig. 4) between the ends thereof.

The counter-balancing mechanism 19 essentially is constructed and arranged to exert a force on the free end of the bellcrank means in a direction to rock the bellcrank means upwardly and raise the magnet. Preferably, this force is less than that of the gravity force exerted by the weight of the suspended magnet by about 25 to 75 pounds, whereby the magnet, upon striking an obstruction, can readily swing upwardly but yet is not so delicately balanced that the magnet can swing freely by the exertion of any slight force thereon.

Such a mechanism, for example, comprises a cylinder 28 pivotally mounted at one end to the chassis (Figs. 1 to 3), a piston 29 in the cylinder, a rod 30 connected to the piston and extending outwardly of the cylinder at its other end, means for pivotally connecting the rod to the free end of the bellcrank means, including a block 31 connected to the end of the rod and a pin 32 extending through the block and the bellcrank members 20 (Fig. 4), and a spring 33 in the cylinder constructed and arranged to exert a force on the piston to cause the rod to urge bellcrank means in a clockwise direction, as viewed in Fig. 1. Preferably, the spring 33 comprises two heavy springs, one inside the other.

In order to prevent the magnet from oscillating after striking an obstruction or after the vehicle has passed over rough terrain, suitable damping means are provided. As shown in Figs. 1, 3 and 4, a conventional snubber 34 is pivotally connected at one end by a pin 35 to the magnet and is pivotally mounted at its other end by a pin 36 on a bracket 37 secured to the chassis (Fig. 4). Two of such snubbers are provided, one at each side of the chassis.

Since it is desirable to protect the magnet against striking large objects or rigid stones or other fixed obstructions projecting upwardly from the ground, means are provided for raising the magnet at will to clear such obstructions and then lowering the magnet after passing over the same. As shown in Figs. 1 to 4 and 6, this is accomplished by a pair of conventional hydraulic motors 38 each associated with one of the bellcrank means 18. One end of each motor is pivotally mounted on a rod 39 supported by a bracket 40 secured to the chassis 10 (Fig. 6), and the other end thereof is pivotally connected to the bellcrank means by a pin 41 extending through the bellcrank members 20 (Figs. 3 and 4) about midway between the pins 27 and 32.

The motor comprises two relatively removable sections, one serving as a cylinder 42 rigidly connected to an enlarged cylinder 42' and having hydraulic fluid conducting means 43 (Fig. 2) connected thereto and the other section serving as a piston and piston rod 44. The flow of hydraulic fluid can be controlled at will in the conventional manner by a manually operable valve located on the instrument panel (not shown). A flexible bellows-like member 44' shields the connecting rod and cylinder from dirt and foreign material.

In order to further protect the magnet against damage when striking obstructions, a bumper 45 consisting of non-magnetic material, such as aluminum, is secured to the magnet. This bumper extends from end to end along the lower front edge of the magnet (Figs. 1 and 3), and comprises a substantially U-shaped spring member having a leg 46 secured to the bumper and a free leg 47 forwardly disposed of the magnet and terminating in an upwardly curled free end 48 adjacently spaced from the lower front edge of the magnet. Upon striking an obstruction, as shown in Fig. 3, the bumper yields to absorb the impact and shields the magnet from contacting the obstruction.

As seen in Figs. 2 and 7, the generator 16 is supported by the chassis at the rear end adjacent the differential gear means 15 and the power take-off shaft 14. The generator is driven by the tractor engine through a large sprocket gear 49 on the power take-off shaft 14, a small sprocket gear 50 on the generator shaft and a chain 51 interconnecting the gears. If desired, the generator could be driven through a gear box in turn driven by the gear 50 to step up the speed of rotation of the generator. This is possible because the tractor engine is highly powered and a large portion of this power is available for driving the generator when the tractor is moving along fairly level but rough terrain.

In operation, while the tractor is moving across the ground, the magnet is suspended several inches above the ground, as shown in Figs. 1 and 3 (full lines) and is energized by the generator to pick up magnetic metallic objects. When the bumper 45 strikes a stone S, such as shown in Fig. 3, the bumper absorbs the impact and guards the magnet, the stone causing the magnet to be raised (Fig. 3 broken lines), automatically by means of the counter-balancing mechanism 19 connected to the bellcrank means 18. This is made possible because the snubbers 34 and the hydraulic motors 38 are pivotally mounted to the magnet and the bellcrank means, respectively, the magnet also being pivotally suspended from the bellcrank means. As shown, the snubbers may be constructed and arranged whereby they rock in an arc of a circle without any tendency to extend or contact the same and their snubbing action is not affected. While the hydraulic motors are extended when this occurs, this is possible because the effective volume of the cylinders 42 is enlarged so that the fluid therein does not interfere with such movement of the pistons 44.

When the magnet has passed over the stone, the weight of the magnet returns the aforementioned elements to their initial position, which is determined by the fact that the cylinders 42 have the same amount of fluid therein as before. Any tendency of the magnet to swing back and forth is damped by the snubbers 34, whereby the magnet is maintained in its most effective operating position.

From the foregoing description, it will be seen that the present invention provides an improved and efficient magnetic sweeper which is particularly useful for clearing magnetic metallic objects from air fields, although it can also be used on roadways and other places. The structure for supporting the magnet is rugged and can readily withstand such rough usage, to which the apparatus may be subjected. Also, the magnet is effectively protected against damage thereto.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What I claim is:

1. In a magnetic sweeper, the combination of a tractor including a chassis, wheels at the front and rear ends of said chassis, an internal combustion engine mounted on said chassis having drive means for driving the wheels at one end of said chassis; an electro-magnet carried by said chassis extending crosswise between said front and rear wheels; an electrical generator mounted on said chassis adjacent the driven wheels; means driven by said drive means for driving said generator, and conductive means interconnecting said generator and electromagnet for energizing said electro-magnet.

2. A magnetic sweeper according to claim 1, wherein said magnet is pivotally suspended from said chassis in a manner to move upwardly upon striking an obstruction.

3. A magnetic sweeper according to claim 2, wherein spring means partially counter-balance the weight of said magnet.

4. A magnetic sweeper according to claim 2, wherein shock absorbing means are connected between said chassis and said magnet.

5. A magnetic sweeper according to claim 2, wherein means are connected between said magnet and said chassis for raising said magnet at will.

6. In a magnetic sweeper, the combination of a land vehicle including a chassis and front and rear wheels, an electro-magnet extending crosswise between said front and rear wheels, and means for pivotally suspending said magnet from said chassis in a manner to enable said magnet to move upwardly upon striking an obstruction, said means including spring means for partially counter-balancing the weight of said magnet to facilitate upward movement thereof.

7. In a magnetic sweeper, the combination of a land vehicle including a chassis and front and rear wheels, an electromagnet extending crosswise between said front and rear wheels, means for pivotally suspending said magnet from said chassis in a manner to enable said magnet to move upwardly upon striking an obstruction, and power means for moving said magnet upwardly at will, said power means being arranged to permit said magnet to move upwardly independently thereof and to limit the lower position of said magnet.

8. In a magnetic sweeper, the combination of a land vehicle including a chassis front and rear wheels, an electromagnet extending crosswise between said front and rear wheels, means for pivotally suspending said magnet from said chassis in a manner to enable said magnet to move upwardly upon striking an obstruction, and shock absorber means constructed and arranged to act as snubbers for limiting the movement of said magnet.

9. In a magnetic sweeper, the combination of a land vehicle including a chassis and front and rear wheels, an electromagnet extending crosswise between said front and rear wheels, and means for pivotally suspending said magnet from said chassis in a manner to enable said magnet to move upwardly upon striking an obstruction, said magnet having a resilient bumper extending along the lower front edge thereof.

10. In a magnetic sweeper according to claim 9, wherein said bumper is a substantially U-shaped member having one leg secured to said magnet and having the other leg extending forwardly thereof.

11. In a magnetic sweeper, the combination of a land vehicle including a chassis and front and rear wheels, an electro-magnet extending crosswise between said front and rear wheels, means for pivotally suspending said magnet from said chassis in a manner to enable said magnet to move upwardly upon striking an obstruction, said means including spring means for partially counterbalancing the weight of said magnet to facilitate upward movement thereof, power means for moving said magnet at will arranged to permit said magnet to move upwardly independently thereof and to limit the lower position of said magnet, and shock absorber means arranged to act as snubbers for limiting the movement of said magnet and to yield upon operation of said power means.

12. In a magnetic sweeper, the combination of a land vehicle including a chassis and front and rear wheels, a bellcrank means at each side of said chassis positioned between said front and rear wheels and pivotally mounted at one end on said chassis, spring means for each of said bellcrank means having one end pivotally connected to said chassis and having the other end pivotally connected to the other end of said bellcrank means, and an electromagnet extending crosswise between said front and rear wheels and being pivotally suspended by said bellcrank means between their ends, said spring means being constructed and arranged to partially counterbalance the weight of said magnet.

13. In a magnetic sweeper according to claim 12, wherein hydraulic motor means are provided for each of said bellcrank means, said motor means having one end pivotally connected to said chassis and having the other end pivotally connected to said bellcrank means for rocking said bellcrank means to effect raising and lowering of said magnet at will.

14. In a magnetic sweeper according to claim 12, wherein shock absorbing means have one end pivotally connected to said chassis and have the other end pivotally connected to said magnet, said shock absorber means being constructed and arranged to act as snubbers for limiting the pivotal movement of said magnet with respect to said bellcrank means.

References Cited in the file of this patent
UNITED STATES PATENTS 1,763,457     Churchill et al. _____ June 10, 1930